(12) United States Patent
Fujita et al.

(10) Patent No.: US 8,187,136 B2
(45) Date of Patent: May 29, 2012

(54) DIFFERENTIAL GEAR

(75) Inventors: Tomoyuki Fujita, Toyohashi (JP); Akira Mataga, Toyohashi (JP)

(73) Assignee: Musashi Seimitsu Industry Co., Ltd., Toyohashi-Shi (JP)

( * ) Notice: Subject to any disclaimer, the term of this patent is extended or adjusted under 35 U.S.C. 154(b) by 743 days.

(21) Appl. No.: 12/237,959

(22) Filed: Sep. 25, 2008

(65) Prior Publication Data
US 2009/0088286 A1 Apr. 2, 2009

(30) Foreign Application Priority Data

Sep. 28, 2007 (JP) ................................ 2007-254519
Sep. 22, 2008 (JP) ................................ 2008-242389

(51) Int. Cl.
*F16H 48/06* (2006.01)
(52) U.S. Cl. ...................................... 475/230; 74/606 R
(58) Field of Classification Search ................ 74/606 R, 74/607; 475/230, 231; 29/463, 525.14
See application file for complete search history.

(56) References Cited

U.S. PATENT DOCUMENTS

| 3,855,015 | A | * | 12/1974 | Nemoto et al. | ............ 492/3 |
| 4,125,026 | A | * | 11/1978 | Torii et al. | ............ 475/230 |
| 6,176,152 | B1 | * | 1/2001 | Victoria et al. | ............ 74/607 |
| 7,008,345 | B2 | * | 3/2006 | Phelan et al. | ............ 475/231 |
| 7,207,110 | B2 | | 4/2007 | Pascoe et al. | |
| 2008/0138649 | A1 | * | 6/2008 | Mataga et al. | ............ 428/684 |

FOREIGN PATENT DOCUMENTS

| JP | 2000-266162 | 9/2000 |
| JP | 2006-509172 | 3/2006 |
| WO | 2004/053357 | 6/2004 |

OTHER PUBLICATIONS

Patent Abstracts of Japan 2000-266162 dated Sep. 26, 2000.

* cited by examiner

*Primary Examiner* — Justin Holmes
*Assistant Examiner* — Huan Le
(74) *Attorney, Agent, or Firm* — Ladas & Parry LLP

(57) ABSTRACT

In a differential gear, a differential case includes: a first differential case on a side ranging from a pinion-shaft installation part on which a pinion shaft is installed, to a ring gear; and a second differential case on a side opposite to the side ranging from a pinion-shaft installation part on which the pinion shaft is installed, to the ring gear. The first differential case is integrally molded from only a low-carbon steel containing less than 0.45% of C, by forging or by forging and cutting. The second differential case is integrally molded from only a low-carbon steel containing less than 0.45% of C, by forging or by forging and cutting. The first differential case and the second differential case are bonded to each other by welding.

8 Claims, 11 Drawing Sheets

| STRUCTURED STEEL | C | Si | Mn | P | S | Ni | Cr | Mo | Cu | V | Ceq | HCS |
|---|---|---|---|---|---|---|---|---|---|---|---|---|
| S15C | 0.16 | 0.18 | 0.72 | 0.017 | 0.024 | 0.04 | 0.11 | 0.01 | 0.13 | 0.00 | 0.313 | 2.217 |
| S25C | 0.26 | 0.18 | 0.72 | 0.017 | 0.024 | 0.04 | 0.11 | 0.01 | 0.13 | 0.00 | 0.413 | 3.603 |
| S35C | 0.36 | 0.18 | 0.72 | 0.017 | 0.024 | 0.04 | 0.11 | 0.01 | 0.13 | 0.00 | 0.513 | 4.989 |
| S45C | 0.46 | 0.18 | 0.72 | 0.017 | 0.024 | 0.04 | 0.11 | 0.01 | 0.13 | 0.00 | 0.613 | 6.375 |
| S50C | 0.51 | 0.18 | 0.72 | 0.017 | 0.024 | 0.04 | 0.11 | 0.01 | 0.13 | 0.00 | 0.663 | 7.067 |
| S55C | 0.55 | 0.18 | 0.72 | 0.017 | 0.024 | 0.04 | 0.11 | 0.01 | 0.13 | 0.00 | 0.703 | 7.622 |
| SCr415H | 0.14 | 0.20 | 0.84 | 0.012 | 0.017 | 0.04 | 1.19 | 0.01 | 0.10 | 0.00 | 0.529 | 0.955 |
| SCr420H | 0.17 | 0.20 | 0.84 | 0.012 | 0.017 | 0.04 | 1.19 | 0.01 | 0.10 | 0.00 | 0.559 | 1.160 |
| SCM415H | 0.15 | 0.25 | 0.73 | 0.012 | 0.017 | 0.04 | 1.05 | 0.20 | 0.10 | 0.00 | 0.495 | 1.264 |
| SCM420H | 0.20 | 0.25 | 0.73 | 0.012 | 0.017 | 0.04 | 1.05 | 0.20 | 0.10 | 0.00 | 0.545 | 1.685 |

FIG.10

| AS STRUCTURED STEELS FOR FUSION WELDING |
|---|
| ◎ : S15C-S15C, S15C-S25C, S15C-SCr415H,<br>   S15C-SCr420H, S15C-SCM415, S15C-SCM420<br>   S25C-SCr415H, S25C-SCr420H,<br>   S25C-SCM415, S25C-SCM420,<br>   S35C-SCr415H, S35C-SCr420H,<br>   S35C-SCM415, S35C-SCM420,<br>   SCr415H-SCr415H, SCr415H-SCr420H,<br>   SCr415H-SCM415, SCr415H-SCM420,<br>   SCr420H-SCr420H, SCr420H-SCM415,<br>   SCr420H-SCM420, SCM415,<br>   SCM415-SCM420, SCM420-SCM420, |
| ○ : S15C-S35C, S25C-S25C, S25C-S35C,<br>   S35C-S35C, |
| ✕ : S45C-Anyone, S50C-Anyone, S55C-Anyone |

FIG.11

DIFFERENTIAL GEAR

CROSS REFERENCE TO RELATED APPLICATIONS

This application is based upon and claims the benefit of priority from the prior Japanese Patent Application Nos. 2007-254519 filed on Sep. 28, 2007, and 2008-242389 filed on Sep. 22, 2008, the entire contents of which are incorporated herein by reference.

FIELD OF THE INVENTION

The present invention relates to a differential gear including: a ring gear to which a driving force is inputted from a driving source so as to be rotated; a differential case configured to be rotated together with the ring gear; a pinion shaft installed on the differential case, the pinion shaft being configured to be rotated together with the differential case; pinion gears pivotally mounted on the pinion shaft; and side gears configured to be meshed with the pinion gears.

BACKGROUND ART

There has been conventionally known a differential gear used in a vehicle such as an automobile, which transmits a driving force (torque) from an engine, through a ring gear, a differential case installed on the ring gear, a pinion shaft installed on the differential case, pinion gears installed on the pinion shaft, and side gears configured to be meshed with the pinion gears. The pinion shaft, the pinion gears, and the side gears, are arranged inside the differential case.

As a method of forming such a differential case of the differential gear, there is known a technique including the steps of: preparing a first differential case and a second differential case; integrally molding the first differential case with a ring gear by forging; integrally molding the second differential case with a pinion-shaft installation part on which a pinion shaft is installed, by forging; and assembling the first differential case and the second differential case by a plurality of bolts (see, JP2000-266162-A).

In another method of forming such a differential case of the differential gear, a first differential case and a second differential case are firstly prepared. The first differential case is molded by pressing, and the second differential case having a pinion-shaft installation part is molded by cold rolling. Then, a ring gear is separately molded. Thereafter, the first differential case and the second differential case are bonded by welding, and the second differential case and the ring gear are bonded by welding (see, JP2006-509172-A).

DISCLOSURE OF THE INVENTION

In the technique of Patent Document 1 in which the first differential case and the second differential case are assembled by a plurality of bolts, a torque from the ring gear is transmitted to the second differential case via a plurality of bolt installation parts. Thus, it is necessary to ensure durability of the plurality of bolt installation parts of the first differential case and the second differential case, and thus it is necessary to increase a thickness of a portion around each bolt installation part. This disadvantageously invites an increase in weight of the differential case. In addition, since a plurality of bolts are required, there is a problem in that the number of components is increased, which results in cost increase.

On the other hand, in the molding method of Patent Document 2, no bolt is used. Thus, the aforementioned problems do not arise. However, since a welding part between the first differential case and the second differential case, and a welding part between the second differential case and the ring gear, are located in an area through which a driving force from an engine is transmitted (an area between the pinion-shaft installation part and the ring gear), there is a possibility that the welding parts, which are relatively poor in strength, are cracked when a torque is transmitted. Namely, the differential case has a durability problem.

The present invention has been made to solve the above problems. It is an object of the present invention to provide a differential gear having a desired durability, in which a first differential case and a second differential case are secured to each other not by means of bolts so as to reduce a weight, and the number of components are reduced so as to reduce a cost.

The present invention is a differential gear comprising: a ring gear to which a driving force is inputted from a driving source so as to be rotated; a differential case configured to be rotated together with the ring gear; a pinion shaft installed on the differential case, the pinion shaft being configured to be rotated together with the differential case; pinion gears pivotally mounted on the pinion shaft; and side gears configured to be meshed with the pinion gears; wherein: the differential case includes: a first differential case on a side ranging from a pinion-shaft installation part on which the pinion shaft is installed, to the ring gear; and a second differential case on a side opposite to the side ranging from the pinion-shaft installation part on which the pinion shaft is installed, to the ring gear; the first differential case is integrally molded from only a low-carbon steel containing less than 0.45% of C, by forging or by forging and cutting; the second differential case is integrally molded from only a low-carbon steel containing less than 0.45% of C, by forging or by forging and cutting; and the first differential case and the second differential case are bonded to each other by welding.

According to the present invention, since no bolt is required to secure the first differential case and the second differential case to each other, thicknesses of the first differential case and the second differential case can be reduced, to thereby reduce a weight of the differential case. Further, since the number of components (bolts) can be reduced, a cost reduction can be achieved. Furthermore, as the first differential case, a part on a side ranging from the pinion-shaft installation part to the ring gear (including the ring gear) is made of only a low-carbon steel containing less than 0.45% of C, and is integrally molded by forging. In addition, a welding part between the first differential case and the second differential case is located outside a torque transmission area (area between the pinion-shaft installation part and the ring gear). Therefore, the welding part that is poor in strength can be prevented from being damaged when a torque is transmitted. Moreover, since the first differential case containing less than 0.45% of C and the second differential case containing less than 0.45% of C are welded to each other, there is little possibility that the welding part hardens to generate a crack. Therefore, there can be provided the differential gear having a desired durability.

Preferably, the first differential case and the pinion shaft are secured to each other by caulking. This securing method is significantly simple. In particular, since the first differential case is integrally molded from only the low-carbon steel containing less than 0.45% of C, by forging or by forging and cutting, the first differential case has an excellent tenacity. Thus, when the pinion shaft is secured thereto by caulking, breakdown of the first differential case can be avoided. In this case, preferably, the pinion shaft is molded from only a low-carbon steel containing less than 0.45% of C. In this case, since the pinion shaft also has an excellent tenacity, when the pinion shaft is secured to the first differential case by caulking, breakdown of the pinion shaft can be avoided.

For example, the first differential case is integrally molded from only a low-carbon steel whose content of C is between 0.10% and 0.40%, by forging or by forging and cutting. Similarly, for example, the second differential case is integrally molded from only a low-carbon steel whose content of C is between 0.10% and 0.40%, by forging or by forging and cutting.

The above consideration is mainly given to carbon steels, whose characteristics are mostly determined by an amount of C (carbon). The inventors of the present invention further studied other structured steels, whose characteristics may be affected by an amount of any other component than C (carbon). As a result, the inventors have found that Carbon Equivalent, instead of the amount of C, should be used as the standard for such structured steels.

The Carbon Equivalent is defined as follows in JIS (Japanese Industrial Standards).

$$\text{Carbon Equivalent (Ceq)} = C + Mn/6 + Si/24 + Ni/40 + Cr/5 + Mo/4 + V/14$$

Herein, C is the amount of carbon (%), Mn is the amount of manganese (%), Si is the amount of silicon (%), Ni is the amount of nickel (%), Cr is the amount of chromium (%), Mo is the amount of molybdenum (%), and V is the amount of vanadium (%).

Then, the threshold "0.45%" of the amount of carbon, which was firstly found by the inventors, can be converted into "0.60%" of the Carbon Equivalent in case of the general carbon steels (for example, S45C), by using the component data thereof (An example of component data of S45C: C=0.46, Mn=0.72, Si=0.18, Ni=0.04, Cr=0.11, V=0.00: the amount of C=0.46%, Carbon Equivalent=0.61%). The inventors have confirmed that such conversion (replacement) is actually applicable to the present invention for not only the general carbon steels but also the other structured steels.

That is, the present invention is a differential gear comprising: a ring gear to which a driving force is inputted from a driving source so as to be rotated; a differential case configured to be rotated together with the ring gear; a pinion shaft installed on the differential case, the pinion shaft being configured to be rotated together with the differential case; pinion gears pivotally mounted on the pinion shaft; and side gears configured to be meshed with the pinion gears; wherein: the differential case includes: a first differential case on a side ranging from a pinion-shaft installation part on which the pinion shaft is installed, to the ring gear; and a second differential case on a side opposite to the side ranging from the pinion-shaft installation part on which the pinion shaft is installed, to the ring gear; the first differential case is integrally molded from only a first structured steel containing less than 0.60% of Carbon Equivalent, by forging or by forging and cutting; the second differential case is integrally molded from only a second structured steel containing less than 0.60% of Carbon Equivalent, by forging or by forging and cutting; and the first differential case and the second differential case are bonded to each other by welding.

According to the present invention, since no bolt is required to secure the first differential case and the second differential case to each other, thicknesses of the first differential case and the second differential case can be reduced, to thereby reduce a weight of the differential case. Further, since the number of components (bolts) can be reduced, a cost reduction can be achieved. Furthermore, as the first differential case, a part on a side ranging from the pinion-shaft installation part to the ring gear (including the ring gear) is made of only a first structured steel containing less than 0.60% of Carbon Equivalent, and is integrally molded by forging, or forging and cutting. In addition, a welding part between the first differential case and the second differential case is located outside the torque transmission area (area between the pinion-shaft installation part and the ring gear). Therefore, the welding part that is poor in strength can be prevented from being damaged when a torque is transmitted. Moreover, since the first differential case made of the first structured steel containing less than 0.60% of Carbon Equivalent and the second differential case made of a second structured steel containing less than 0.60% of Carbon Equivalent are welded to each other, there is little possibility that the welding part hardens to generate a crack. Therefore, there can be provided the differential gear having a desired durability.

In a case where the first structured steel and the second structured steel are bonded by fusion welding, if the sum of a value of Hot Crack Sensitivity of the first steel part and a value of Hot Crack Sensitivity of the second steel part is less than 7.0, generation of a crack may be prevented more surely. The value of Hot Crack Sensitivity is calculated in accordance with the following expression.

$$\text{Hot Crack Sensitivity (HCS)} = 1000 \times C(S+P+Si/25+Ni/100)/(3Mn+Cr+Mo+V)$$

Herein, C is the amount of carbon (%), S is the amount of sulfur (%), P is the amount of phosphorus (%), Si is the amount of silicon (%), Ni is the amount of nickel (%), Mn is the amount of manganese (%), Cr is the amount of chromium (%), Mo is the amount of molybdenum (%), and V is the amount of vanadium (%).

BRIEF DESCRIPTION OF THE DRAWINGS

FIG. 10 shows a data table of structured steels including general carbon steels.

FIG. 11 shows a result of evaluation as structured steels for fusion welding, regarding the structured steels shown in FIG. 10.

BEST MODE FOR CARRYING OUT THE INVENTION

Figure 1:
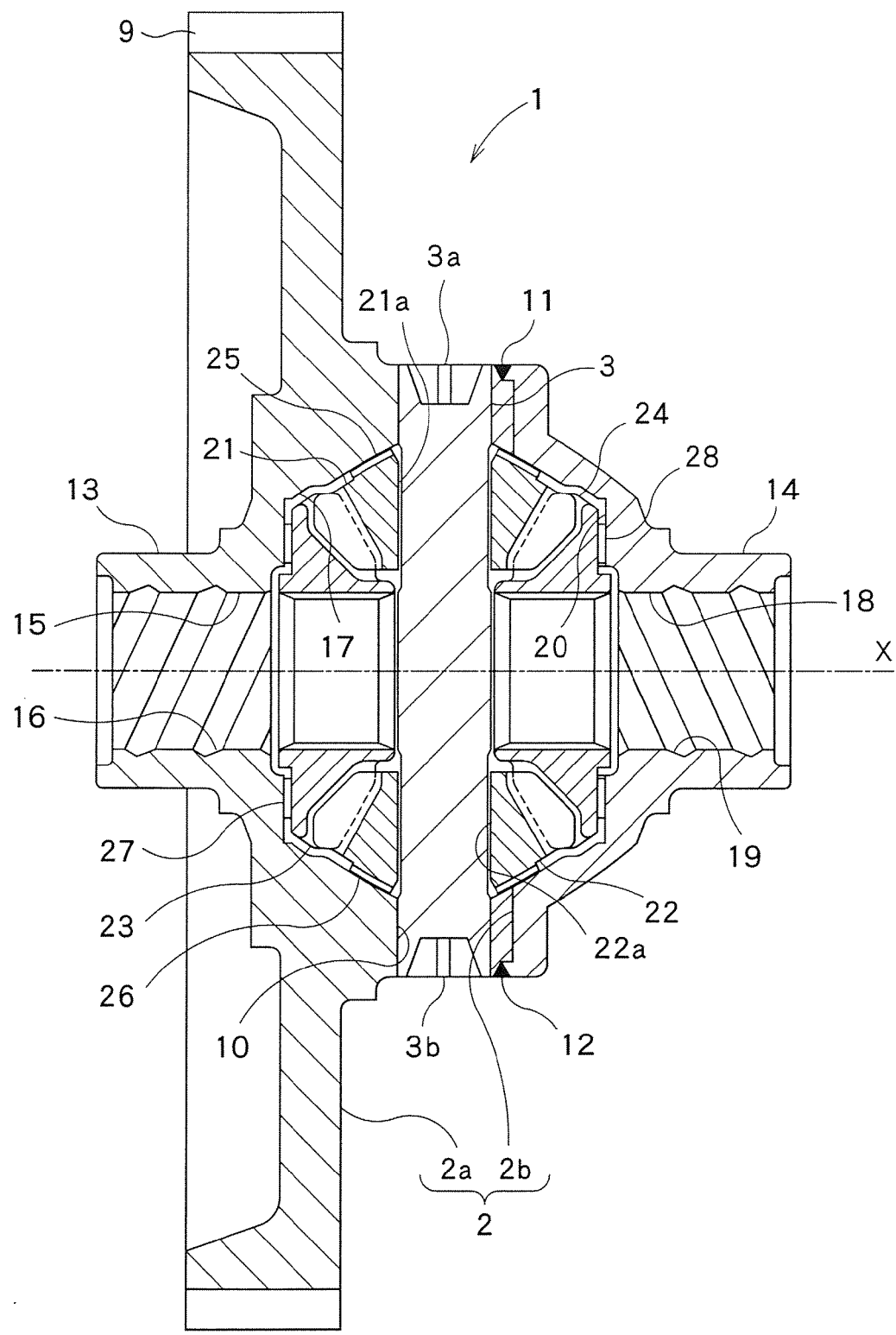
FIG. 1 is a sectional view of a differential gear in one embodiment of the present invention.

FIG. 1 is a sectional view of a differential gear in one embodiment of the present invention.

Figure 2A:
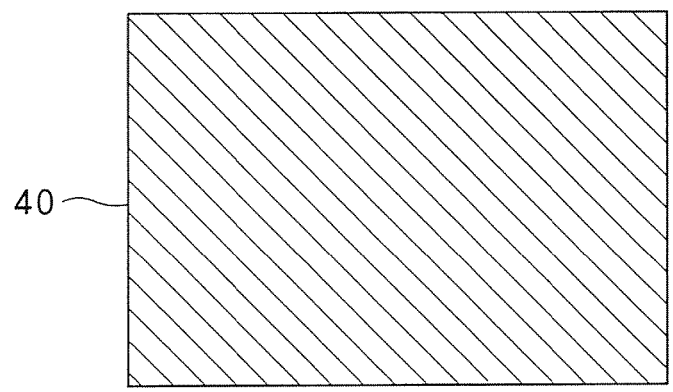
FIG. 2A is a sectional view of a first material, for explaining a molding step of a first differential case of the differential gear in one embodiment of the present invention.
Figure 2B:
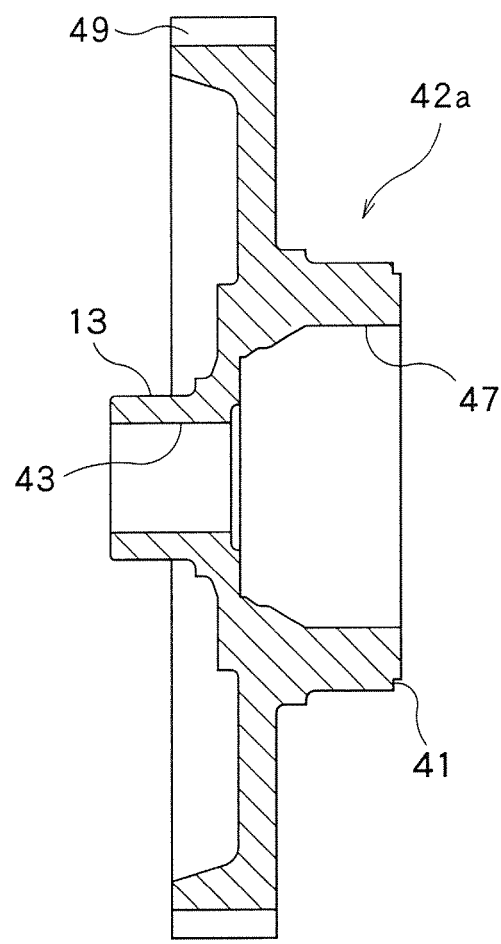
FIG. 2B is a sectional view of a preparatory first differential case, for explaining the molding step of the first differential case of the differential gear in one embodiment of the present invention.
Figure 3:
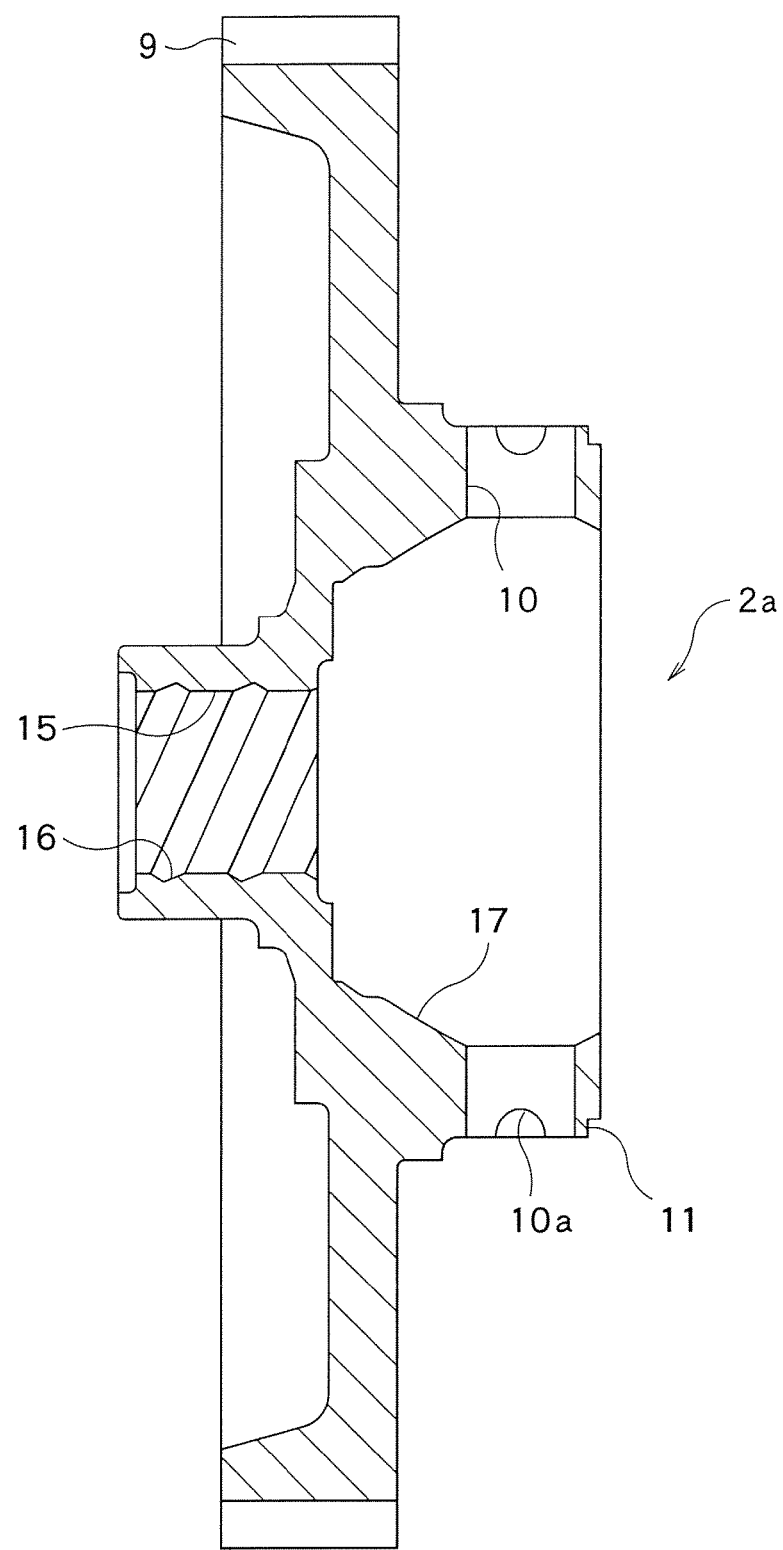
FIG. 3 is a sectional view of the first differential case of the differential gear in one embodiment of the present invention.
Figure 4A:
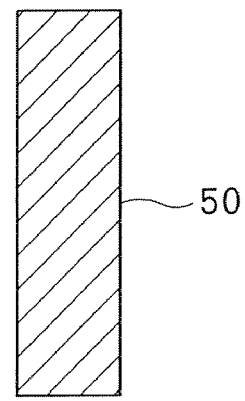
FIG. 4A is a sectional view of a second material, for explaining a molding step of a second differential case of the differential gear in one embodiment of the present invention.

FIG. 2A is a sectional view of a first material, for explaining a molding step of a first differential case of the differential gear in one embodiment of the present invention. FIG. 2B is a sectional view of a preparatory first differential case, for explaining the molding step of the first differential case of the differential gear in one embodiment of the present invention. FIG. 3 is a sectional view of the first differential case of the differential gear in one embodiment of the present invention. FIG. 4A is a sectional view of a second material, for explaining a molding step of a second differential case of the differential gear in one embodiment of the present invention.

Figure 4B:
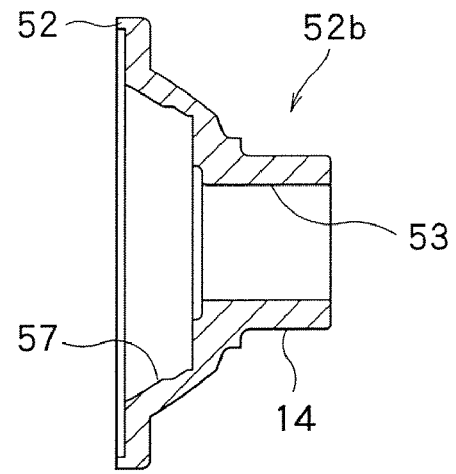
FIG. 4B is a sectional view of a preparatory second differential case, for explaining the molding step of the second differential case of the differential gear in one embodiment of the present invention.
Figure 4C:
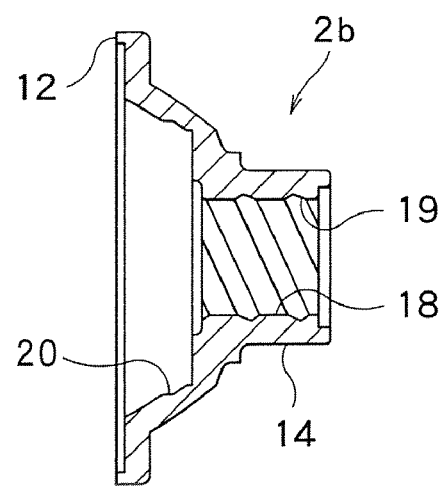
FIG. 4C is a sectional view of the second differential case of the differential gear in one embodiment of the present invention.
Figure 5A:
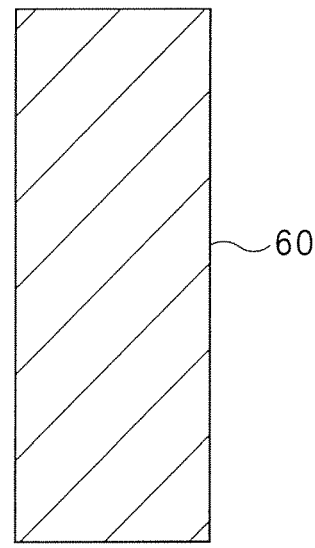
FIG. 5A is a sectional view of a third material, for explaining a molding step of a pinion shaft of the differential gear in one embodiment of the present invention.
Figure 5B:
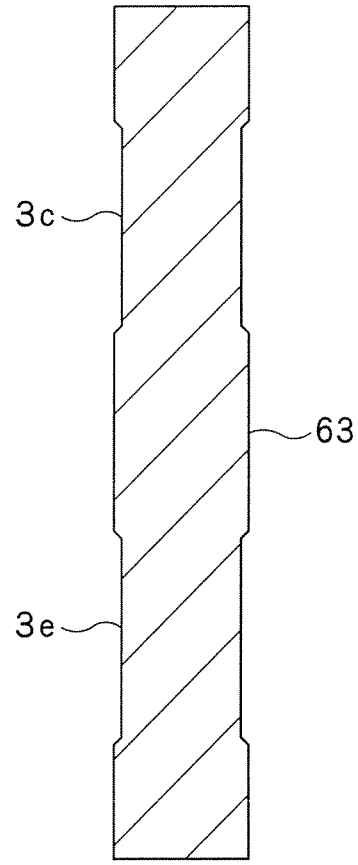
FIG. 5B is a sectional view of a preparatory pinion shaft, for explaining the molding step of the pinion shaft of the differential gear in one embodiment of the present invention.
Figure 6A:
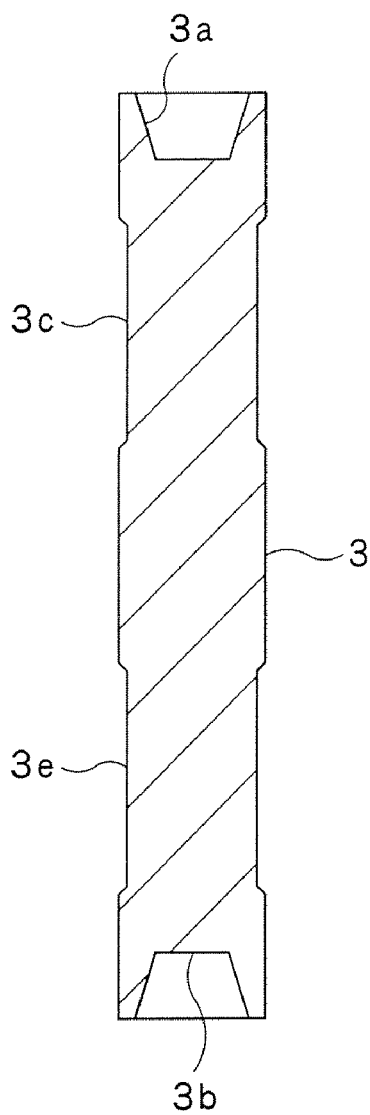
FIG. 6A is a sectional view of the pinion shaft of the differential gear in one embodiment of the present invention.
Figure 6B:
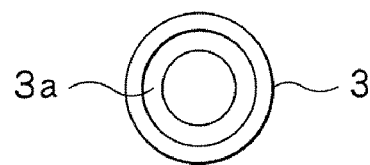
FIG. 6B is a plan view of the pinion shaft of the differential gear in one embodiment of the present invention.

FIG. 4B is a sectional view of a preparatory second differential case, for explaining the molding step of the second differential case of the differential gear in one embodiment of the present invention. FIG. 4C is a sectional view of the second differential case of the differential gear in one embodiment of the present invention. FIG. 5A is a sectional view of a third material, for explaining a molding step of a pinion shaft of the differential gear in one embodiment of the present invention. FIG. 5B is a sectional view of a preparatory pinion shaft, for explaining the molding step of the pinion shaft of the differential gear in one embodiment of the present invention. FIG. 6A is a sectional view of the pinion shaft of the differential gear in one embodiment of the present invention. FIG. 6B is a plan view of the pinion shaft of the differential gear in one embodiment of the present invention.

Figure 7:
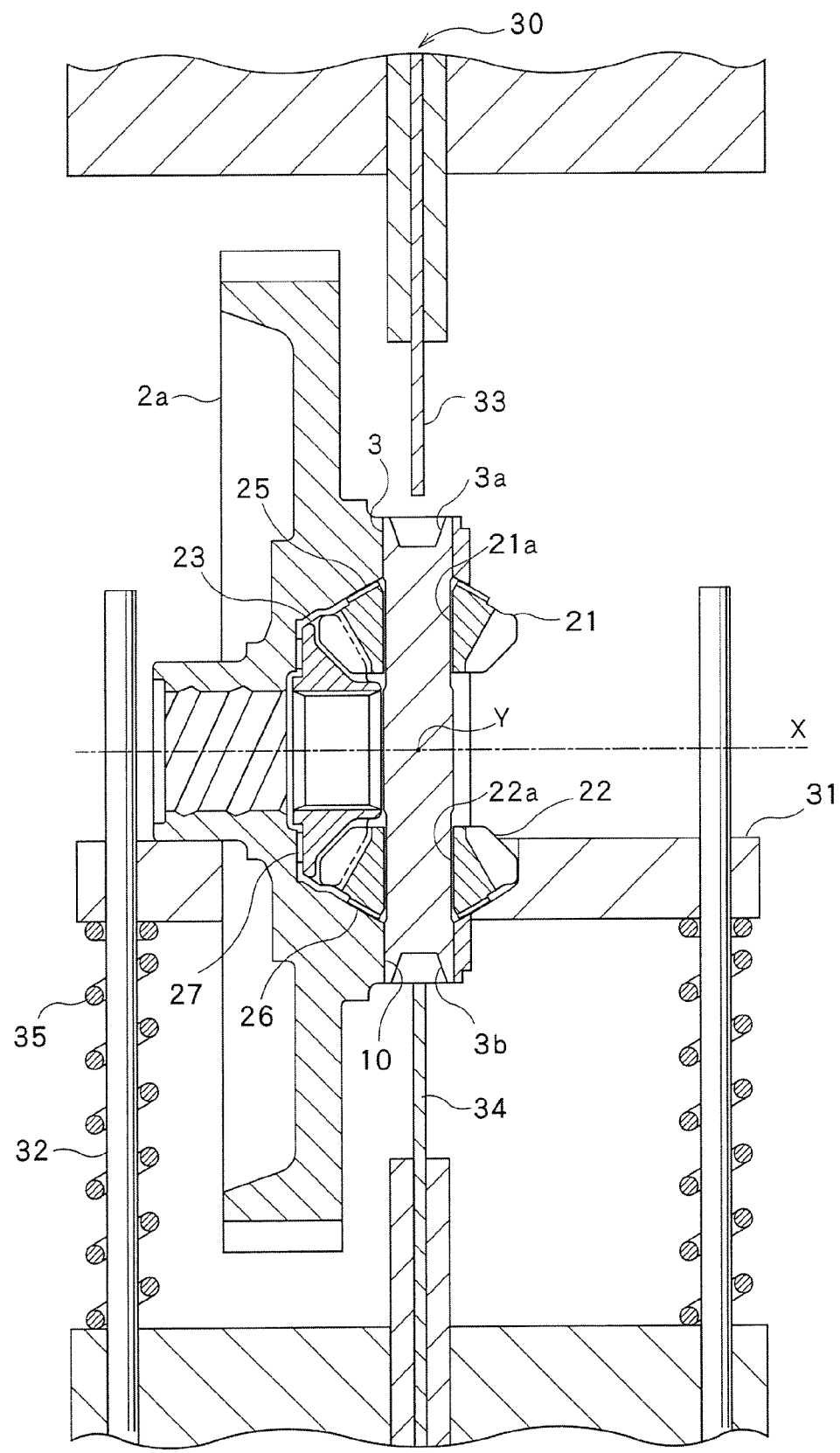
FIG. 7 is a sectional view of an apparatus for caulking the first differential case and the pinion shaft.
Figure 8A:
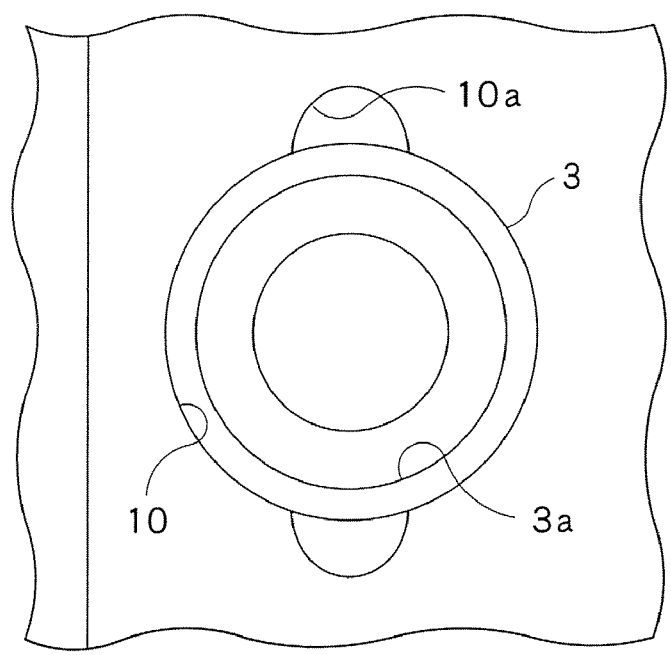
FIG. 8A is a plan view of a main part of a pinion-shaft installation part of the first differential case, before the pinion shaft is caulked and secured thereto.
Figure 8B:
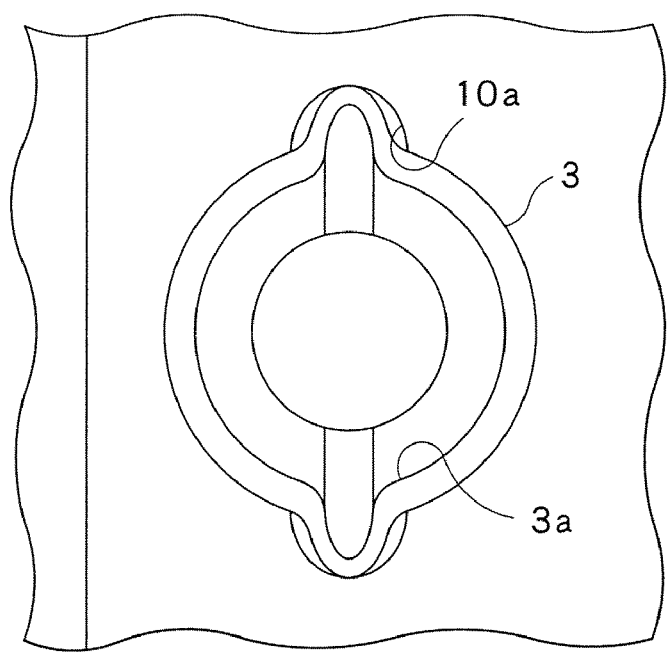
FIG. 8B is a plan view of the main part of the pinion-shaft installation part of the first differential case, after the pinion shaft has been caulked and secured thereto.
Figure 9:
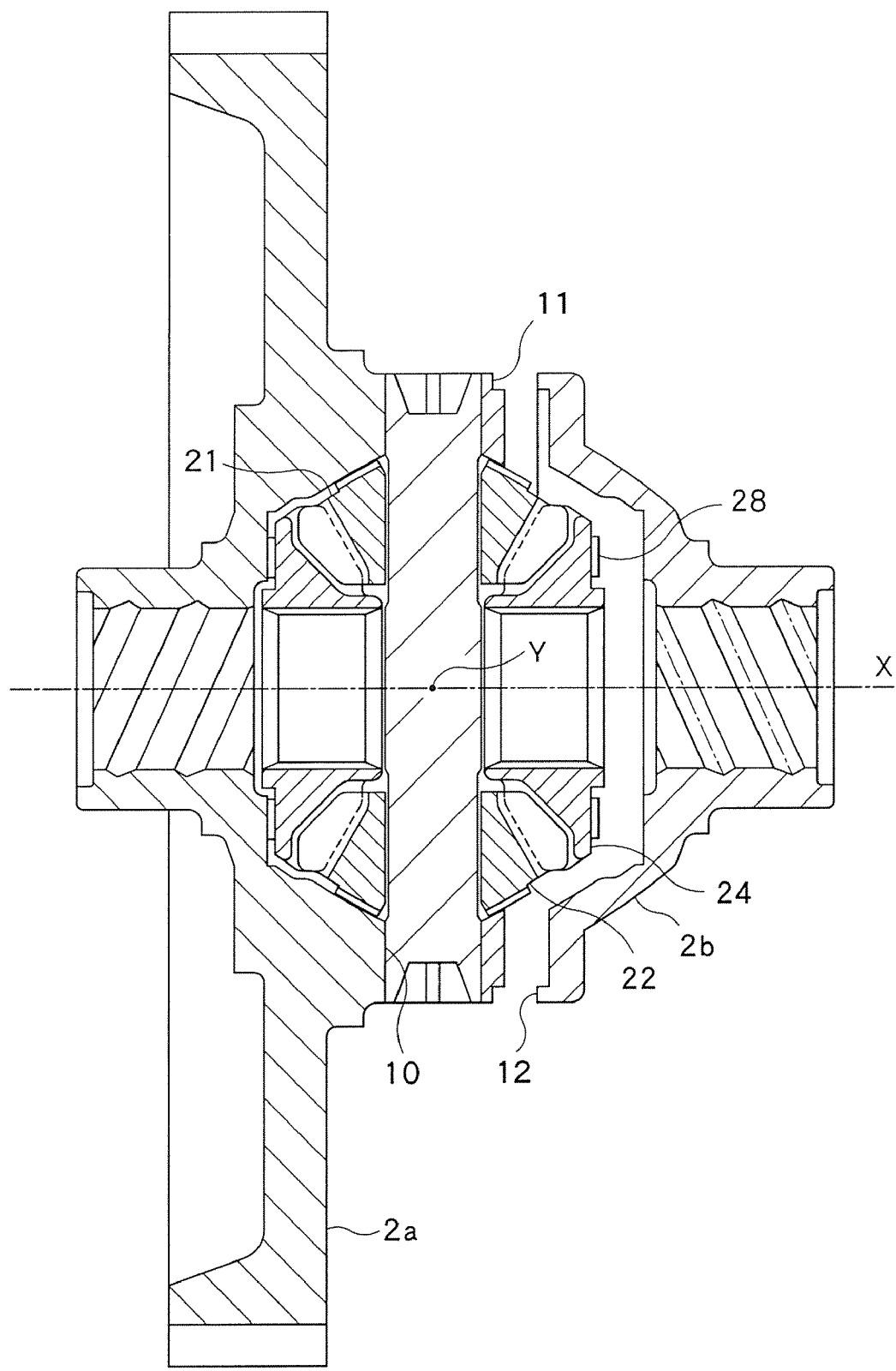
FIG. 9 is a sectional view for explaining a method of assembling the first differential case and the second differential case.

FIG. 7 is a sectional view of an apparatus for caulking the first differential case and the pinion shaft. FIG. 8A is a plan view of a main part of a pinion-shaft installation part of the first differential case, before the pinion shaft is caulked and secured thereto. FIG. 8B is a plan view of the main part of the pinion-shaft installation part of the first differential case, after the pinion shaft has been caulked and secured thereto. FIG. 9 is a sectional view for explaining a method of assembling the first differential case and the second differential case.

At first, a differential gear 1 is described with reference to FIG. 1. A differential case 2 of the differential gear 1 is composed of a first differential case 2a and a second differential case 2b.

The first differential case 2a is made of only a low-carbon steel (first structured steel) containing less than 0.45% of C, and has on one axial end thereof a first boss part 13 that is axially extended. A first through-hole 15 is formed inside the first boss part 13. Communicated with the first through-hole 15 is a first gear chamber 17 whose diameter is larger than that of the first through-hole 15. Communicated with the first gear chamber 17 is a pinion-shaft installation part 10 on which a pinion shaft 3 is installed. In addition, there is provided a ring gear 9 which projects in an outer radial direction about an axis line X. In addition, in an outer circumference on the other axial end, there is formed a fitting recess 11 in which the second differential case 2b is fitted.

The second differential case 2b is also made of only a low-carbon steel (second structured steel) containing less than 0.45% of C, and has on the other axial end thereof a second boss part 14 that is axially extended. A second through-hole 18 is formed inside the second boss part 14. Communicated with the second through-hole 18 is a second gear chamber 20 whose diameter is larger than that of the second through-hole 18. On an outer circumference on the one axial end, there is formed a fitting projection 12 to which the fitting recess 11 of the first differential case 2a is fitted. The fitting recess 11 and the fitting projection 12 are bonded to each other by any of electron beam welding, laser welding, and resistance welding. In this manner, the difference case 2 is structured.

The content C in the first structured steel is between 0.10% and 0.40%, for example. The content C in the second structured steel is also between 0.10% and 0.40%, for example.

In the differential case 2, there are disposed: the pinion shaft 3 configured to be rotated together with the differential case 2; pinion gears 21 and 22 pivotally mounted on the pinion shaft 3; thrust washers for pinion gear 25 and 26 disposed between the respective pinion gears 21 and 22 and the differential case 2; side gears 23 and 24 configured to be meshed with the pinion gears 21 and 22; and thrust washers for side gear 27 and 28 disposed between the respective side gears 23 and 24 and the differential case 2. The content C in a structured steel forming the pinion shaft is also between 0.10% and 0.40%, for example.

Next, a method of forming the first differential case 2a is described with reference to FIGS. 2A to 3.

At first, from a cylindrical first material 40, shown in FIG. 2A, which is a low-carbon steel (e.g., SCM420 and S35C) containing less than 0.45% of C (preferably, between 0.10% and 0.40%), a preparatory first differential case 42a, shown in FIG. 2B, is molded by a plastic deformation by hot forging.

As shown in FIG. 2B, the preparatory first differential case 42a has on one axial end thereof the first boss part 13 that is axially extended. A preparatory first through-hole 43 is formed inside the first boss part 13. Communicated with the preparatory first through-hole 43 is a preparatory first gear chamber 47 whose diameter is larger than that of the preparatory first through-hole 43. In addition, there is formed a preparatory ring gear 49 which projects in the outer radial direction about the axis line X. In addition, in the outer circumference on the other axial end, there is formed a preparatory fitting recess 41.

As shown in FIG. 3, the preparatory first through-hole 43 of the preparatory first differential case 42a is bored and finished, and a first lubrication groove 16 is formed by cutting, so that the first through-hole 15 is provided. The preparatory first gear chamber 47 is cut in conformity to shapes of the thrust washers for pinion gear 25 and 26 and a shape of the thrust washer for side gear 27, so that the first gear chamber 17 is provided. Further, the pinion-shaft installation part 10 is formed by cutting between the outer circumference on the other axial end of the preparatory first differential case 42a and the first gear chamber 17. A caulking recess 10a is formed by cutting in an outer diametrical end of the pinion-shaft installation part 10. The preparatory ring gear 49 and the preparatory fitting recess 41 are respectively cut into required shapes, so that the ring gear 9 and the fitting recess 11 are provided.

The preparatory first differential case 42a, which has been subjected to the cutting process, is then carburized and quenched, whereby a hardness thereof is increased.

Due to the above steps, the first differential case 2a having a desired hardness can be completed as an integral mold piece, as a whole, which is formed by forging. An area from the ring gear 9 to the pinion-shaft installation part 10, which is a torque transmission area, is seamless in terms of material.

Next, a method of forming the second differential case 2b is described with reference to FIGS. 4A to 4C.

At first, from a cylindrical second material 50, shown in FIG. 4A, which is a low-carbon steel (e.g., SCM420 and S35C) containing less than 0.45% of C (preferably, between 0.10% and 0.40%), a preparatory second differential case 52b, shown in FIG. 4B, is molded by a plastic deformation by hot forging.

As shown in FIG. 4B, the preparatory second differential case 52b has on one axial end thereof the second boss part 14 that is axially extended. A preparatory second through-hole 58 is formed inside the second boss part 14. Communicated with the preparatory second through-hole 54 is a preparatory second gear chamber 57 whose diameter is larger than that of the preparatory second through-hole 53. In the outer circumference on the other axial end, there is formed a preparatory fitting projection 52.

As shown in FIG. 4C, the preparatory second through-hole 53 of the preparatory second differential case 52b is bored and finished, and a second lubrication groove 19 is formed by cutting, so that the second through-hole 18 is provided. The preparatory second gear chamber 57 is cut in conformity to shapes of the thrust washers for pinion gear 25 and 26 and a shape of the thrust washer for side gear 28, so that the second gear chamber 20 is provided. In addition, the preparatory fitting projection 52 is cut into a required shape, so that the fitting projection 12 is provided.

Due to the above steps, the second differential case 2b having a desired hardness can be completed as an integral mold piece, as a whole, which is formed by forging. Since a required hardness of the second differential case 2b is lower than that of the first differential case 2a, the second differential case 2b is not subjected to a carburizing and quenching process.

Next, a method of forming the pinion shaft 3 is described with reference to FIGS. 5A to 6B.

At first, from a cylindrical third material 60, shown in FIG. 5A, which is a low-carbon steel (e.g., SCM415) containing less than 0.45% of C (preferably, between 0.10% and 0.40%), a preparatory pinion shaft 63, shown in FIG. 5B, is molded by a plastic deformation by cold forging.

As shown in FIG. 5B, the preparatory pinion shaft 63 has a diameter smaller than that of the third material 60, and has an axial length longer than that of the third material 60. In addition, the preparatory pinion shaft 63 has a lubrication surface 3c at a position in opposition to a pinion gear hole 21a of the pinion gear 21, and a lubrication surface 3e at a position in opposition to a pinion gear hole 22a of the pinion gear 22.

Following thereto, in order to increase a hardness thereof, the preparatory pinion shaft 63 is carburized and quenched. Thereafter, as shown in FIGS. 6A and 6B, pinion shaft recesses 3a and 3b are formed by cutting in opposed axial ends. Further, outer circumferences of the opposed axial ends are cut (carburized and quenched portions of the opposed axial ends of the pinion shaft 3 are removed). Due to the above steps, the pinion shaft 3 having a desired shape and a desired hardness can be formed.

Next, a caulking apparatus 30 for installing the pinion shaft 3 on the first differential case 2a is described with reference to FIG. 7. The caulking apparatus 30 has on its center part a support table 31 on which the first differential case 2a can be placed. The support table 31 is supported by columns 32. The caulking apparatus 30 is equipped with an upper caulking punch 33 and a lower caulking punch 34, for caulking the opposed ends of the pinion shaft 3 to the pinion shaft installation part 10 of the first differential case 2a. A spring 35 is disposed around each of the columns 32, whereby the support table 31 is located at a substantially intermediate position of the column 32 by an elastic force of the spring 35.

A method of assembling the differential gear 1 is described with reference to FIG. 7, FIGS. 8A and 8B, and FIG. 9.

As shown in FIG. 7, the side gear 23 in which the thrust washer for side gear 27 has been attached on a side away from a tooth profile thereof is placed on a rotation axis X of the first differential case 2a such that a tooth-profile side of the side gear 23 faces a center Y of the differential case.

Then, the pinion gear 21 in which the thrust washer for pinion gear 25 has been attached on a side away from a tooth profile thereof, and the pinion gear 22 in which the thrust washer for pinion gear 26 has been attached on a side away from a tooth profile thereof, are opposedly positioned to each other over the rotation axis X of the differential case, such that the respective pinion gears 21 and 22 are meshed with the side gear 23. At this time, the pinion gear holes 21a and 22 of the respective pinion gears 21 and 22, the pinion-shaft installation part 10 of the first differential case 2a, and holes of the respective thrust washers for pinion gear 25 and 26 are aligned to each other.

Subsequently, the pinion shaft 3 is inserted through the pinion-shaft installation part 10, the hole of the thrust washer for pinion gear 25, and the pinion gear hole 21a formed in the pinion gear 21, to reach the rotation axis X of the first differential case 2a. The pinion shaft 3 is further guided to the pinion gear hole 22a of the pinion gear 22, the hole of the thrust washer for pinion gear 26, and the pinion-shaft installation part 10, which are in symmetrical with respect to the rotation axis X. Then, the pinion shaft 3 is positioned at a predetermined location of the first differential case 2a. At this time, as shown in FIG. 8A, the opposed ends of the pinion shaft 3 are merely in contact with the pinion-shaft installation part 10 of the first differential case 2a, and thus the pinion shaft 3 is movable with respect to the first differential case 2a.

The first differential case 2a, in which the pinion gears 21 and 22, the thrust washers for pinion gear 25 and 26, the side gear 23, and the pinion shaft 3 have been arranged in position, is placed on the support table 31 of the caulking apparatus 30. At this time, in order that the pinion shaft 3 does not drop out of the first differential case 2a, the one axial end of the pinion shaft 3 is supported by the lower caulking punch 34.

After that, the upper caulking punch 33 disposed above the support table 31 is moved downward. The support table 31 is located at the substantially intermediate positions of the columns 32 by the elastic forces of the springs 5 disposed around the columns 32 of the support table 31. However, when a distal end of the upper caulking punch 33 presses down the pinion shaft recess 3a of the pinion shaft 3, the first differential case 2a placed on the support table 31 and the support table 31 are moved downward, while the springs 35 are contracted.

Then, the distal end of the upper caulking punch 33 is pressed into the pinion shaft recess 3a, and a distal end of the lower caulking punch 34 is pressed into the pinion shaft recess 3b. At this time, as show in FIG. 8B, by the upper caulking punch 33 and the lower caulking punch 34, the pinion shaft recesses 3a and 3b are plastically deformed into installation recesses 10a of the pinion-shaft installation part 10 of the first differential case 2a. Namely, a caulking process is performed. Herein, since the carburized and quenched portions of the opposed axial ends of the pinion shaft 3 have been removed in advance by cutting, there is no possibility that the pinion shaft recesses 3a and 3b are cracked, when the pinion shaft recesses 3a and 3b are plastically deformed into the installation recesses 10a.

After the caulking process has been finished, the upper caulking punch 33 is moved upward, so that the first differential case 2a placed on the support table 31 and the support table 31 are returned to the substantially intermediate position of the columns 32 by restoring forces of the springs 35. In this manner, securing of the first differential case 2a and the pinion shaft 3 by caulking is finished.

Thereafter, as shown in FIG. 9, the side gear 24 in which the thrust washer for side gear 28 has been attached on a side away from a tooth profile thereof is placed such that the side gear 24 is meshed with the pinion gears 21 and 22.

Then, the fitting recess 11 of the first differential case 2a and the fitting projection 12 of the second differential case 2b are fitted to each other. Subsequently, the fitting recess 11 and the fitting projection 12 are fusion-bonded by electron beam welding, whereby assemblage of the differential case 2 of the differential gear 1 is finished.

According to the above differential case 2, since no bolt is required to secure the first differential case 2a and the second differential case 2b to each other, thicknesses of the first differential case 2a and the second differential case 2b can be reduced, to thereby reduce a weight of the differential case 2. Further, since the number of components (bolts) can be reduced, a cost reduction can be achieved. Furthermore, as the first differential case 2a, a part on a side ranging from the pinion-shaft installation part 10 to the ring gear 9 (including the ring gear 9) is made of only the low-carbon steel containing less than 0.45% of C, and is integrally molded by forging. In addition, a welding part between the first differential case 2a and the second differential case 2b is located outside the torque transmission area (area between the pinion-shaft installation part 10 and the ring gear 9). Therefore, the welding part that is poor in strength can be prevented from being damaged when a torque is transmitted. Moreover, since the first differential case 2a containing less than 0.45% of C and the second differential case 2b containing less than 0.45% of C are welded to each other, there is little possibility that the welding part hardens to generate a crack. Therefore, there can be provided the differential gear 1 having a desired durability.

In addition, since the first differential case 2a and the pinion shaft 3 are secured to each other by caulking, the first differential case 2a and the pinion shaft 3 can be secured to each other in a significantly simple manner. In particular, since the first differential case 2a is made of only the low-carbon steel containing less than 0.45% of C and is integrally molded by forging as a whole, the first differential case 2a has an excellent tenacity. Therefore, when the pinion shaft 3 is secured thereto by caulking, breakdown of the first differential case 2a can be avoided.

In addition, the pinion shaft 3 is also molded from only the low-carbon steel containing less than 0.45% of C. Thus, since the pinion shaft 3 also has an excellent tenacity, when the pinion shaft 3 is secured to the first differential case 2a by caulking, breakdown of the pinion shaft 3 can be avoided.

In the above embodiment, molding of the first differential case 2a and the second differential case 2b is performed by hot forging. However, cold forging and warm forging may be used.

In addition, the bonding operation by electron beam welding is taken as an example of fusing and bonding the first differential case 2a and the second differential case 2b. However, another fusion welding, such as laser welding and resistance welding, may be used.

In addition, the positioning upon welding is performed by means of the fitting recess 11 formed in the first differential case 2a and the fitting projection 12 formed on the second differential case 2b. However, the positioning may be performed by means of a fitting projection formed on the first differential case 2a and a fitting recess formed in the first differential case 2b.

Further, in the above embodiment, the pinion shaft 3 and the first differential case 2a are secured to each other by caulking by plastically deforming the opposed ends of the pinion shaft 3 into the first differential case 2a. However, the pinion shaft 3 and the first differential case 2a may be secured to each other by caulking by plastically deforming the first differential case 2a into the opposed ends of the pinion shaft 3.

In addition, in order to prevent the welding part from hardening to generate a crack, the first differential case 2a and the second differential case 2b are made of the low-carbon steel containing less than 0.45% of C, which is an important feature of the present invention. Preferably, the content of C is between 0.10% and 0.40% in the light of preventing hardening of the welding part. More preferably, the content of C is between 0.10% and 0.35% in the light of preventing hardening of the welding part.

The above explanation is mainly given to carbon steels, whose characteristics are mostly determined by an amount of C (carbon). The inventors of the present invention further studied other structured steels, whose characteristics may be affected by an amount of any other component than C (carbon). As a result, the inventors have found that Carbon Equivalent, instead of the amount of C, should be used as the standard for such structured steels.

The Carbon Equivalent is defined as follows in JIS (Japanese Industrial Standards).

Carbon Equivalent (Ceq)=C+Mn/6+Si/24+Ni/40+Cr/5+Mo/4+V/14

Herein, C is the amount of carbon (%), Mn is the amount of manganese (%), Si is the amount of silicon (%), Ni is the amount of nickel (%), Cr is the amount of chromium (%), Mo is the amount of molybdenum (%), and V is the amount of vanadium (%).

Then, the threshold "0.45%" of the amount of carbon, which was firstly found by the inventors, can be converted into "0.60%" of the Carbon Equivalent in case of the general carbon steels (for example, S45C), by using the component data thereof (An example of component data of S45C: C=0.46, Mn=0.72, Si=0.18, Ni=0.04, Cr=0.11, V=0.00: the amount of C=0.46%, Carbon Equivalent=0.61%). The inventors have confirmed that such conversion (replacement) is actually applicable to the present invention for not only the general carbon steels but also the other structured steels.

Namely, in comparison with the above embodiment, in place of the low-carbon steel containing less than 0.45% of C, there may be used a structured steel containing less than 0.60% of carbon equivalent.

Also in this case, since no bolt is required to secure the first differential case 2a and the second differential case 2b to each other, thicknesses of the first differential case 2a and the second differential case 2b can be reduced, to thereby reduce a weight of the differential case 2. Further, since the number of components (bolts) can be reduced, a cost reduction can be achieved. Furthermore, as the first differential case 2a, a part on a side ranging from the pinion-shaft installation part 10 to the ring gear 9 (including the ring gear 9) is made of only a first structured steel containing less than 0.60% of Carbon Equivalent, and is integrally molded by forging, or forging and cutting. In addition, a welding part between the first differential case 2a and the second differential case 2b is located outside the torque transmission area (area between the pinion-shaft installation part 10 and the ring gear 9). Therefore, the welding part that is poor in strength can be prevented from being damaged when a torque is transmitted. Moreover, since the first differential case 2a made of the first structured steel containing less than 0.60% of Carbon Equivalent and the second differential case 2b made of a second structured steel containing less than 0.60% of Carbon Equivalent are welded to each other, there is little possibility that the welding part hardens to generate a crack. Therefore, there can be provided the differential gear 1 having a desired durability.

Furthermore, when the first structured steel and the second structured steel are bonded by fusion welding, if the sum of a value of Hot Crack Sensitivity of the first structured steel and a value of Hot Crack Sensitivity of the second structured steel is less than 7.0, generation of a crack may be prevented more surely. The value of Hot Crack Sensitivity is calculated in accordance with the following expression.

Hot Crack Sensitivity (HCS)=1000×C (S+P+Si/25+ Ni/100)/(3Mn+Cr+Mo+V)

Herein, C is the amount of carbon (%), S is the amount of sulfur (%), P is the amount of phosphorus (%), Si is the amount of silicon (%), Ni is the amount of nickel (%), Mn is the amount of manganese (%), Cr is the amount of chromium (%), Mo is the amount of molybdenum (%), and V is the amount of vanadium (%).

FIG. 10 shows a data table of structured steels including general carbon steels. In the table, Ceq means the Carbon Equivalent, and HCS means the Hot Crack Sensitivity. FIG. 11 shows a result of evaluation as structured steels for fusion welding (first differential case 2a and second differential case 2b), regarding the structured steels shown in FIG. 10.

As shown in FIG. 9, in the evaluation as structured steels for fusion welding, "0.45%" of the amount of carbon and "0.60%" of the Carbon Equivalent were threshold of the eligibility. In addition, when the sum of values of Hot Crack Sensitivity of two structured steels to be fusion welded is less than 7.0, it was actually confirmed that generation of a crack may be prevented more surely.

It is needless to say that workability is also taken into consideration in selecting structured steel(s). Some structured steels may not be used if they have poor workability.

The invention claimed is:

1. A differential gear assembly comprising:
ring gear (9) to which a driving force is inputted from a driving source so as to be rotated;
a differential case (2) configured to be rotated together with the ring gear (9);
a pinion shaft (3) installed on the differential case (2), the pinion shaft (3) being configured to be rotated together with the differential case (2);
pinion gears (21, 22) pivotally mounted on the pinion shaft (3); and
side gears (23, 24) configured to be meshed with the pinion gears (21, 22);
wherein:
the differential case (2) includes: (i) a first differential case (2a) on a first side of the differential case and comprising a pinion shaft installation part (10) on which the pinion shaft (3) is installed, the ring gear (9) and an area ranging from the pinion-shaft installation part (10) on which the pinion shaft (3) is installed to the ring gear (9); and (ii) a second differential case (2b) on a second side of the differential case opposite to the first side and not comprising the area ranging from the pinion-shaft installation part (10) on which the pinion shaft (3) is installed to the ring gear (9);
wherein the first differential case (2a) is integrally molded from only a low-carbon steel containing less than 0.45% of carbon, by forging or by forging and cutting;
wherein the second differential case (2b) is integrally molded from only a low-carbon steel containing less than 0.45% of carbon, by forging or by forging and cutting; and
wherein the first differential case (2a) and the second differential case (2b) are bonded to each other by welding to form a weld outside of the area ranging from the pinion-shaft installation part and the ring gear, said area being seamless.

2. The differential gear assembly according to claim 1, wherein
the first differential case (2a) is integrally molded from only a low-carbon steel whose content of carbon is between 0.10% and 0.40%, by forging or by forging and cutting.

3. The differential gear assembly according to claim 1, wherein
the second differential case (2b) is integrally molded from only a low-carbon steel whose content of carbon is between 0.10% and 0.40%, by forging or by forging and cutting.

4. The differential gear assembly according to claim 1, wherein
the first differential case (2a) and the pinion shaft (3) are secured to each other by caulking.

5. The differential gear assembly according to claim 4, wherein
the pinion shaft (3) is molded from only a low-carbon steel containing less than 0.45% of carbon.

6. A differential gear assembly comprising:
a ring gear (9) to which a driving force is inputted from a driving source so as to be rotated;
a differential case (2) configured to be rotated together with the ring gear (9);
a pinion shaft (3) installed on the differential case (2), the pinion shaft (3) being configured to be rotated together with the differential case (2);
pinion gears (21, 22) pivotally mounted on the pinion shaft (3); and
side gears (23, 24) configured to be meshed with the pinion gears (21, 22);
wherein:
the differential case (2) includes: a first differential case (2a) on a first side, the first differential case comprising a pinion shaft installation part (10) on which the pinion shaft (3) is installed, the ring gear (9), and an area ranging from the pinion-shaft installation part (10) on which the pinion shaft (3) is installed, to the ring gear (9); and a second differential case (2b) on a side opposite to the first side and not comprising the area ranging from the pinion-shaft installation part (10) on which the pinion shaft (3) is installed to the ring gear (9);

wherein the first differential case (*2a*) is integrally molded from only a first structured steel containing less than 0.60% of Carbon Equivalent, by forging or by forging and cutting;

wherein the second differential case (*2b*) is integrally molded from only a second structured steel containing less than 0.60% of Carbon Equivalent, by forging or by forging and cutting; and wherein the first differential case (*2a*) and the second differential case (*2b*) are bonded to each other by welding to form a weld outside of the area ranging from the pinion-shaft installation part and the ring gear, said area being seamless.

7. The differential gear assembly according to claim 6, wherein the first structured steel and the second structured steel are selected such that a sum of a hot crack sensitivity of the first structured steel and a hot crack sensitivity of the second structured steel is not more than 7.

8. The differential gear assembly according to claim 6, wherein the first differential case (*2a*) and the pinion shaft (3) are secured to each other by caulking.

* * * * *